(12) United States Patent
Scherz et al.

(10) Patent No.: US 11,611,370 B2
(45) Date of Patent: Mar. 21, 2023

(54) ANTENNA SYSTEM

(71) Applicant: Rohde & Schwarz GmbH & Co. KG, Munich (DE)

(72) Inventors: Alfred Scherz, Munich (DE); Miguel Buenodiez, Munich (DE); Nico Riedmann, Munich (DE); Andreas Knuettel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 350 days.

(21) Appl. No.: 16/919,710

(22) Filed: Jul. 2, 2020

(65) Prior Publication Data
US 2021/0044325 A1 Feb. 11, 2021

(30) Foreign Application Priority Data
Aug. 7, 2019 (EP) .................................. 19190565

(51) Int. Cl.
| | |
|---|---|
| *H01Q 13/04* | (2006.01) |
| *H04B 3/52* | (2006.01) |
| *H01P 3/16* | (2006.01) |
| *H01Q 9/28* | (2006.01) |
| *H01Q 13/02* | (2006.01) |
| *H04B 3/56* | (2006.01) |

(52) U.S. Cl.
CPC ................ *H04B 3/52* (2013.01); *H01P 3/16* (2013.01); *H01Q 9/28* (2013.01); *H01Q 13/02* (2013.01); *H04B 3/56* (2013.01)

(58) Field of Classification Search
CPC . H01P 3/16; H04B 3/52; H01Q 13/02; H01Q 13/04; H01Q 21/10; H01Q 9/28
See application file for complete search history.

(56) References Cited

U.S. PATENT DOCUMENTS

| | | | | |
|---|---|---|---|---|
| 3,829,863 | A * | 8/1974 | Lipsky | H01Q 21/24 343/773 |
| 5,534,880 | A * | 7/1996 | Button | H01Q 13/04 343/905 |
| 6,667,721 | B1 * | 12/2003 | Simonds | H01Q 9/28 343/773 |
| 7,408,521 | B2 * | 8/2008 | Smith | H01Q 9/28 343/773 |
| 8,228,257 | B2 | 7/2012 | Lalezari | |
| 9,608,323 | B1 | 3/2017 | Berens et al. | |
| 2005/0078044 | A1 * | 4/2005 | Rodriguez | H01Q 13/0275 343/786 |
| 2009/0237314 | A1 | 9/2009 | Lalezari | |
| 2011/0304508 | A1 * | 12/2011 | Remez | G01S 3/48 342/442 |
| 2015/0042532 | A1 | 2/2015 | Parsche | |

FOREIGN PATENT DOCUMENTS

JP          1-78412          * 11/1987

* cited by examiner

*Primary Examiner* — Tho G Phan
(74) *Attorney, Agent, or Firm* — Christensen O'Connor Johnson Kindness PLLC

(57) ABSTRACT

An antenna system comprises at least one antenna, a feeding line and a cable guide for a line not feeding the at least one antenna. The at least one antenna has a feeding portion to which the feeding line is assigned. The cable guide has an opening that is provided in the feeding portion.

17 Claims, 4 Drawing Sheets

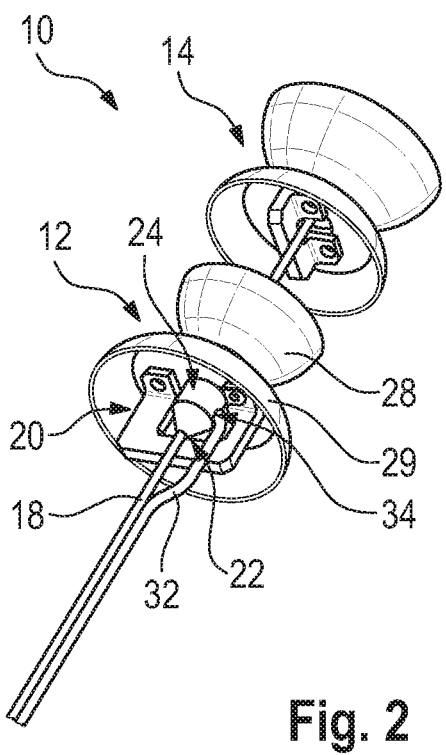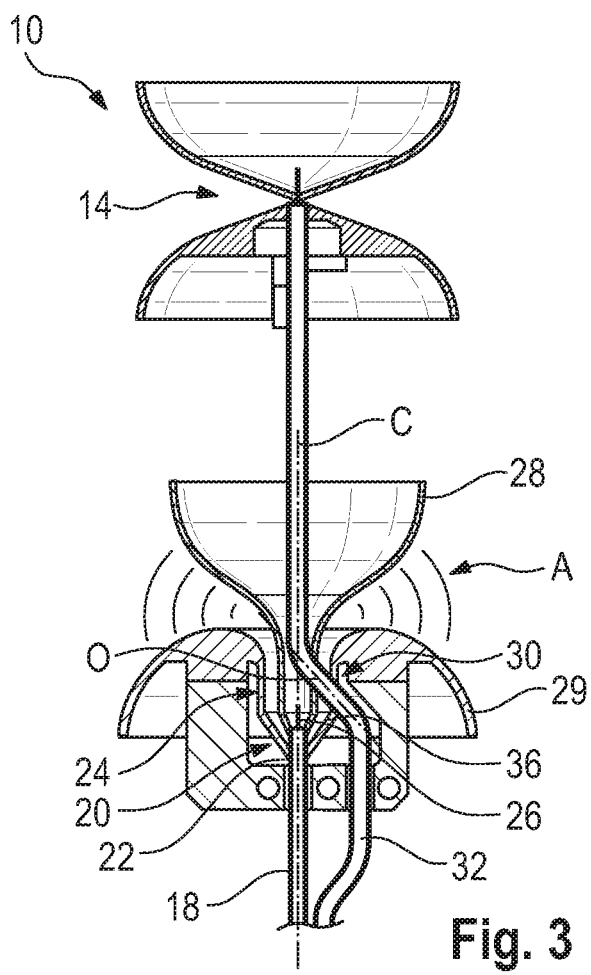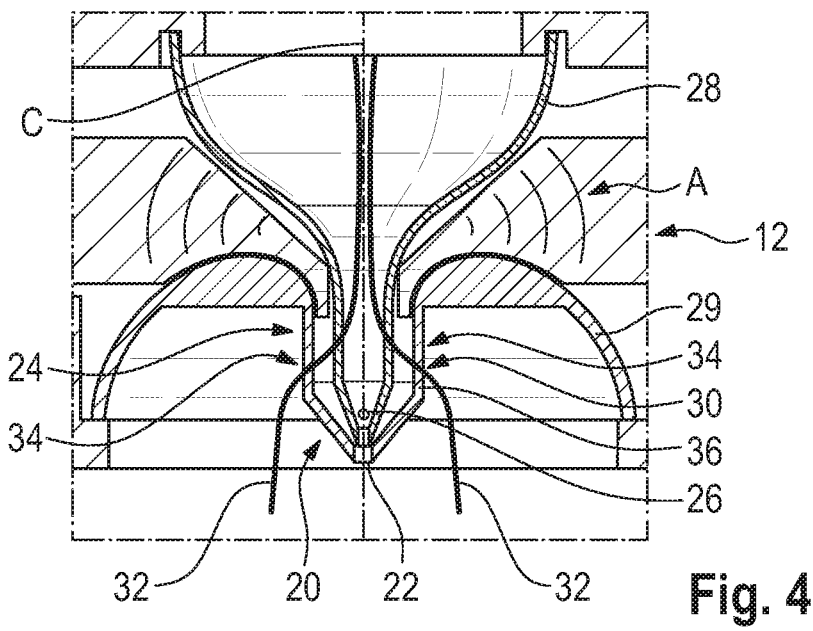

ANTENNA SYSTEM

FIELD OF THE DISCLOSURE

The present disclosure relates to an antenna system, particularly an omnidirectional antenna system.

BACKGROUND

In antenna systems, it is frequently necessary to provide two or more antennas in a restricted space, for instance in a housing. The installation of these antennas within the restricted space is difficult, as the antennas have to be fed with signals, without disturbing the radiation pattern of the antennas.

Locating two or more antennas next to each other, particularly omnidirectional antennas, would result in an overall radiation pattern that is disturbed, as the antennas disturb each other. Further, disturbances also arise due to the fact that the respective feeding line of a certain antenna is routed in front of another antenna and, thus, the feeding line disturbs the radiation pattern from the latter antenna in the direction in which the feeding line is located. However, these problems do not solely arise in antenna systems having several antennas to be fed with signals, but also with antenna systems comprising electrical loads or other components that are fed with signals or power for operating purposes.

Generally, the respective line or cable routed to the upper antenna or rather the electrical load shall have a small length in order to reduce the impact of line loss due to a too long length of the line or cable. In fact, the length also has an influence on the radiation performance of the antenna system.

Besides the electric components, other components may also be connected with a line having an influence on the radiation pattern of the at least one antenna, for instance a liquid line or rather a gas line.

Accordingly, there is a need for an antenna system that provides an optimized radiation performance

SUMMARY

The present disclosure provides examples of an antenna system. In an embodiment, the antenna system comprises at least one antenna, a feeding line and a cable guide for a line not feeding the at least one antenna. The at least one antenna has a feeding portion to which the feeding line is assigned. The cable guide has an opening that is provided in the feeding portion.

Accordingly, the cable guide ensures to route the line of the antenna system, which is not feeding the at least one antenna, in an optimized manner. In some embodiments, the opening of the cable guide is located in the feeding portion of the at least one antenna such that the line is routed through the feeding portion of the at least one antenna. This ensures that the respective cable length of the line not feeding the at least one antenna can be minimized while simultaneously having a minimized impact on the radiation pattern of the at least one antenna.

The cable guide further ensures that the line has not to be guided in front of the at least one antenna, namely in front of its aperture, which would result in a disturbed radiation pattern of the at least one antenna. In contrast, the line guided by the cable guide is routed within the feeding portion, for example along a center axis of the at least one antenna, in order to have a minimized influence on the radiation pattern of the at least one antenna. As the line is routed along the center axis of the at least one antenna, for example the entire antenna system, the length of the line is minimized resulting in a minimized line loss.

In some embodiments, the cable guide is located in the feeding portion of the at least one antenna, wherein the feeding portion relates to the part of the at least one antenna that is used to conduct the electromagnetic waves to be radiated by the at least one antenna. Put differently, the feeding portion is electrically connected with the feeding line. Thus, electrical signals are forwarded to the at least one antenna, namely its feeding portion, via the feeding line. The feeding portion converts the electrical signals received via the feeding line into electromagnetic waves to be radiated over-the-air, for instance in an omnidirectional manner.

The antenna system may comprise a line that is not feeding the at least one antenna, for example the at least one antenna that has the cable guide located in its feeding portion.

This respective antenna, namely the antenna with the cable guide located in its feeding portion, may relate to a first antenna.

Accordingly, the cable guide is provided for a line not feeding the first antenna.

In general, the feeding portion may correspond to a coaxial feeding portion, which comprises an inner conductor and an outer conductor.

Hence, the feeding portion may be realized by the antenna itself, a coaxial waveguide or a coaxial cable. The coaxial waveguide or rather the coaxial cable may relate to an interface for the feeding line.

In some embodiments, the cable guide is assigned to both the inner conductor and the outer conductor. Put differently, the cable guide has at least two openings, wherein at least one opening is provided in the outer conductor and at least one opening is provided in the inner conductor. The openings assigned to the inner and outer conductors may be orientated such that they are aligned with respect to each other, for example regarding the orientation of the line to be guided by the cable guide.

Thus, the feeding portion, for instance the coaxial feeding portion, is penetrated by the line.

The respective line may correspond to a coaxial line, a power line, a hollow conductor, a tube, a wire or any other suitable kind of cable that may be routed to another antenna, a component of the antenna system or rather an electrical load.

The line may have an outer surface comprising at least partially an electromagnetically conductive material. Hence, the line does not necessarily have an electric insulation at its outer circumference.

Generally, an electromagnetic signal or a medium such as a liquid or a gas may be conducted by the line.

According to an aspect, the feeding portion has an axial end to which the feeding line is connected. Thus, the feeding line can be easily connected with the feeding portion of the at least one antenna via its axial end, as this axial end can be accessed easily.

Further, the opening may be located at the lateral side of the feeding portion. This ensures that the cable guide has at least a minimized interaction, preferably it does not interact, with the feeding line as the line to be routed via the cable guide is not feeding the at least one antenna. In some embodiments, the line is only routed through the opening provided in the feeding portion, namely its lateral side. The lateral side is substantially perpendicular to the axial end of the feeding portion to which the feeding line is connected.

In some embodiments, the opening has a center axis that is inclined with respect to the lateral side of the feeding portion by an inclination angle. The inclination angle may range from 5° to 85° such that the line routed through the opening of the cable guide is directed into a certain direction due to the inclination of the opening with respect to the lateral side.

However, the opening may also have no inclination with respect to the lateral side.

According to an aspect, the at least one antenna has a flared horn portion and a center axis, wherein the opening is orientated in the feeding portion such that the line guided through the opening runs substantially along the center axis in the space limited by the flared horn portion. The flared horn portion may be a cone or rather frustum due to its shape, namely a substantially circular cross section. The respective cable guide located in the feeding portion, for example its lateral side, ensures that the line runs through the flared horn portion substantially in its middle such that it has a minimized influence on the electromagnetic waves generated, namely the radiation pattern of the at least one antenna.

The center axis of the at least one antenna may correspond to an axis of symmetry. This ensures that the influence of the line routed along the center axis of the at least one antenna has a homogenously distributed influence on the radiation pattern, which is minimized in total.

In some embodiments, the center axis relates to a rotationally symmetric axis of the at least one antenna. Hence, at least the flared horn portion is rotationally symmetric. For instance, the flared horn portion has a cone or rather frustum shape. As discussed above, the influence of the line routed along the center axis within the flared horn portion is homogenously distributed.

Another aspect provides that the feeding portion comprises a waveguide section and a feed point. The feed point of the feeding portion is electrically connected with the feeding line directly, whereas the waveguide section of the feeding portion surrounds the feed point. In some embodiments, the feed point is assigned to the axial end of the feeding portion. When feeding the feeding portion with an electrical signal, an electromagnetic wave is generated by the feeding portion, for example the waveguide section and the feed point. The electromagnetic waves generated propagate along the waveguide section for being radiated. In some embodiments, the waveguide section may be established by the lateral side of the feeding portion. Hence, the opening of the cable guide is located within the waveguide section.

The waveguide section may relate to a coaxial waveguide section. This means that the coaxial waveguide section comprises an inner conductor, namely an inner waveguide portion, and an outer conductor, namely an outer waveguide portion.

The waveguide section may comprise an electromagnetically conductive section. The electromagnetically conductive section may relate to the lateral sides or rather lateral walls of the feeding portion. The electromagnetic waves generated propagate along the lateral sides or rather lateral walls of the feeding portion, namely the electromagnetically conductive section.

In some embodiments, the opening is provided in the electromagnetically conductive section. The opening is located in a side wall or lateral wall of the electromagnetically conductive section.

According to another aspect, the electromagnetically conductive section merges partially into the flared horn portion. Put differently, the waveguide section merges at least partly into the flared horn portion. The flared horn portion is also electromagnetically conductive. Thus, the electromagnetic waves generated in the feeding portion of the at least one antenna propagate along the waveguide section, for example at least partly along the flared horn portion.

Put differently, the aperture of the at least one antenna is provided at least in parts at an end of the flared horn portion, via which the electromagnetic waves are radiated into the environment, for instance in an omnidirectional manner.

Another aspect provides that the cable guide has several openings for several lines. Thus, more than one line may be routed by the cable guide, for example along the center axis of the at least one antenna. The more than one line may be assigned to different antennas and/or electrical loads that are stacked over each other. In some embodiments, it is ensured that medium, signals and/or power can be forwarded to the components located above the at least one antenna via the lines routed along the cable guide.

The lines are routed through the feeding portion as well as within the flared horn portion of the at least one antenna, which yields a minimal disturbance of the radiation pattern as well as a minimal cable length of the respective lines resulting in minimized line losses.

Accordingly, the line is routed along the center axis of the at least one antenna over the entire flared horn portion of the at least one antenna. Put differently, the line is routed in an inclined manner with respect to the center axis within the waveguide section.

The at least one antenna may be a coaxial horn antenna. Thus, the at least one antenna is fed by an coaxial cable in order to receive respective signals which are converted into electromagnetic waves to be radiated by the coaxial horn antenna in an omnidirectional manner.

As mentioned above, the feeding portion may relate to a coaxial feeding portion, which comprises an inner conductor and an outer conductor.

Hence, the coaxial horn antenna may comprise an assigned antenna portion besides the flared horn portion. In some embodiments, the inner conductor is connected with the flared horn portion, whereas the outer conductor is connected with the assigned antenna portion. In other words, the inner conductor may merge into the flared horn portion, whereas the outer conductor may merge into the assigned antenna portion.

However, the outer conductor may also be connected with or rather merge into the flared horn portion, whereas the inner conductor is connected with or rather merge into the assigned antenna portion.

Generally, a coaxial antenna, also often called coaxial dipole, is a specific form of a half-wave dipole antenna. Typically, the coaxial antenna is employed as a vertically polarized omnidirectional antenna.

Accordingly, the antenna system may relate to an omnidirectional antenna system, wherein the at least one antenna is an omnidirectional antenna. Thus, the electromagnetic waves generated by the antenna system are radiated into the environment in an omnidirectional manner.

Further, the antenna system may have a first antenna and a second antenna which are stacked over one another. Both antennas may share a common center axis, wherein the center axis may relate to an axis of symmetry. As the line is routed along the cable guide such that it runs substantially along the center axis in the space limited by the flared horn portion of the first antenna, it is ensured that the line loss is minimized, as the length of the line routed to the second antenna is minimized Simultaneously, it is ensured that the radiation pattern is disturbed only in a minimized manner.

Furthermore, the second antenna may be a biconical antenna. The biconical antenna is also called bicone antenna. In some embodiments, the biconical antenna has a symmetry plane from which two substantially similar conductive objects, for instance cones, extend in opposite directions.

Generally, the antenna system, for example each of the antenna(s), has a broad bandwidth. However, the antenna system, for example each of the antenna(s), may also have a narrow bandwidth.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 schematically shows an isometric view of an antenna system according to an embodiment of the present disclosure;

FIG. 3 schematically shows a sectional view of the antenna system shown in FIG. 2;

FIG. 4 schematically shows a sectional view of a detail of an antenna system according to a second embodiment of the present disclosure;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
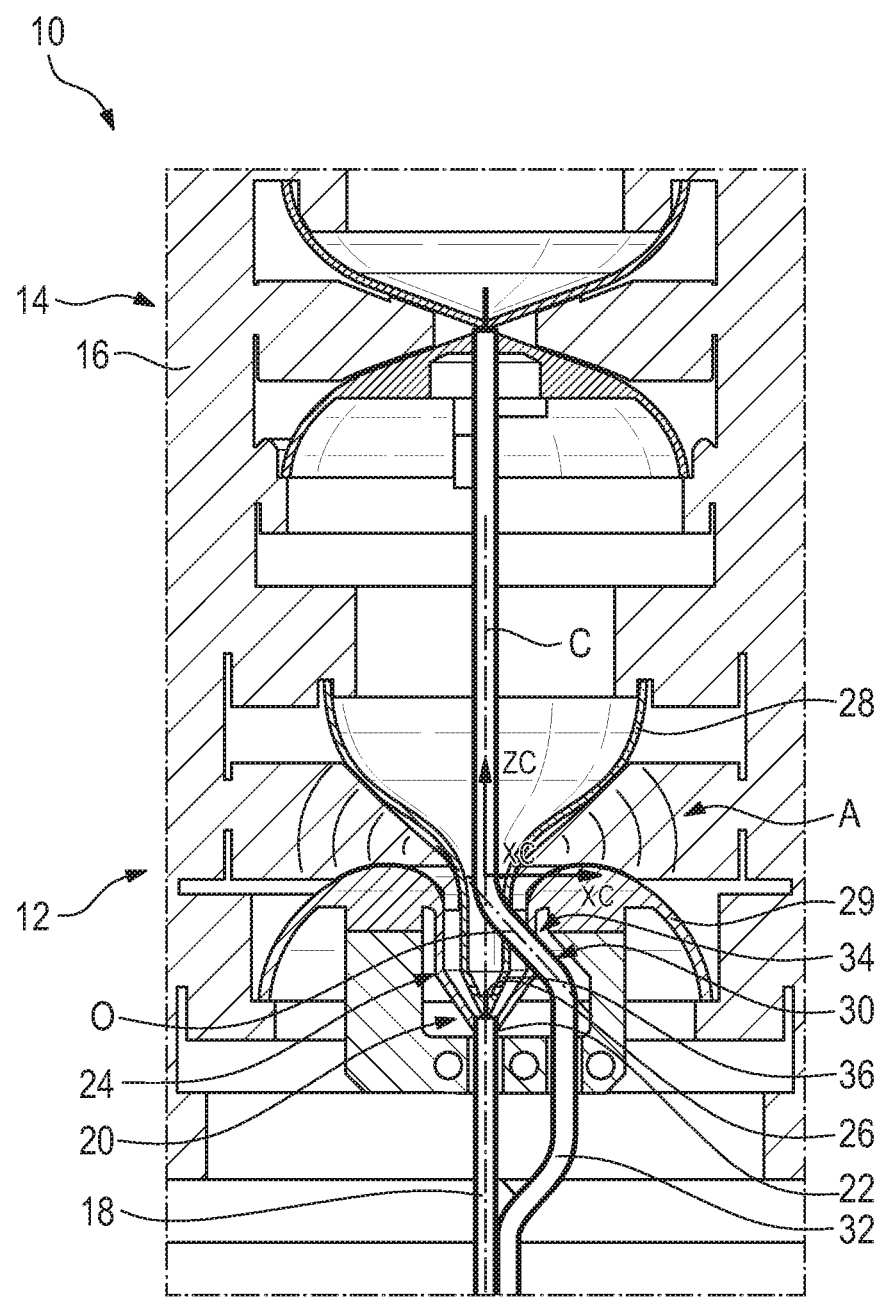
FIG. 1 schematically shows a sectional view of an antenna system according to a first embodiment of the present disclosure.
Figure 5:
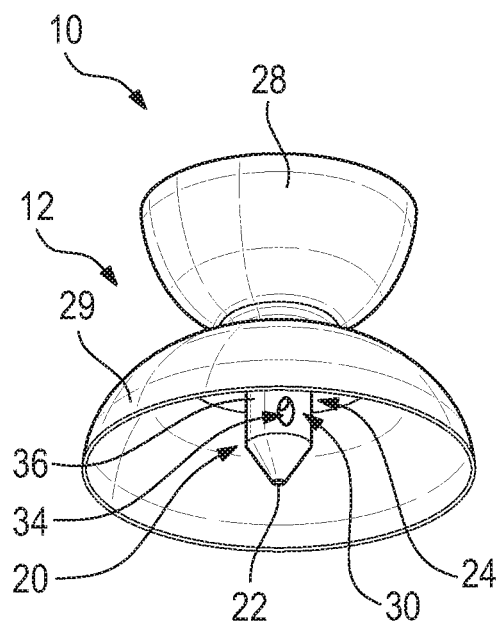
FIG. 5 shows an isometric view of an antenna system according to another embodiment of the present disclosure without feeding line of the first antenna.
Figure 6:
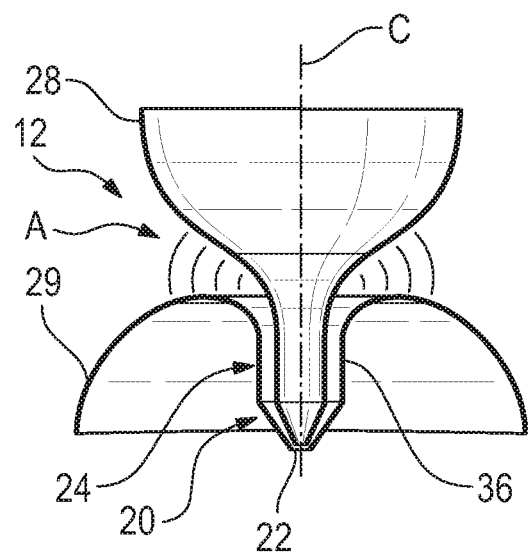
FIG. 6 shows a sectional view of the antenna system shown in FIG. 5.

In FIG. 1-3, an antenna system 10 according to a first embodiment is shown that comprises a first antenna 12 and a second antenna 14 that are stacked over one another. The antenna system 10 relates to an omnidirectional antenna system, as both antennas 12, 14 relate to omnidirectional antennas. In some embodiments, the first antenna 12 corresponds to a coaxial horn antenna, whereas the second antenna 14 corresponds to a biconical antenna, as will be described hereinafter in more detail.

As shown in FIG. 1, the antenna system 10 comprises a housing 16 in which the first antenna 12 as well as the second antenna 14 are located. In the illustrations according to FIGS. 2 and 3, the housing 16 is not shown. The antenna system 10 also comprises a feeding line 18 that is electrically connected with the first antenna 12 in order to forward electrical signals to the first antenna 12.

The first antenna 12 comprises a feeding portion 20 to which the feeding line 18 is connected. The feeding portion 20 of the first antenna 12 is generally configured to generate electromagnetic waves that are radiated by the antenna system 10, as will be described later. In some embodiments, the feeding portion 20 corresponds to a coaxial feeding portion, which has an inner conductor and an outer conductor, as will be described in more detail with reference to FIGS. 9-11.

As shown in FIG. 1, the feeding line 18 is connected with an axial end 22 of the feeding portion 20, which merges into a cylindrical, for example circular cylindrical, waveguide section 24. The feeding portion 20 also has a feed point 26 that is surrounded by the waveguide section 24.

In some embodiments, the feed point 26 is electrically connected with the feeding line 18 so as to receive the electrical signals forwarded via the feeding line 18. The feed point 26 electromagnetically interacts with the waveguide section 24, for example an electromagnetically conductive section of the waveguide section 24, in order to generate electromagnetic waves.

The electromagnetic waves propagate along the waveguide section 24 towards an open end of the first antenna 12, namely an aperture A of the first antenna 12. Via the aperture, the electromagnetic waves are radiated in an omnidirectional manner, as indicated in FIGS. 1, 3 and 4 by the respective lines.

The waveguide section 24 partially merges into a flared horn portion 28 at which opposite end, an open end is provided. The flared horn portion 28 widens towards the open end. The waveguide section 24 also partially merges into an assigned antenna portion 29. The electromagnetic waves to be radiated propagate between the flared horn portion 28 and the assigned antenna portion 29, as indicated in FIGS. 1, 3 and 4.

As shown in FIGS. 2, 3 and 4, the inner conductor of the coaxial feeding portion 20 is connected with the flared horn portion 28, whereas the outer conductor of the coaxial feeding portion 20 is connected with the assigned antenna portion 29. The flared horn portion 28 and/or the assigned antenna portion 29 are/is rotationally symmetric such that the center axis C corresponds to an axis of symmetry. In some embodiments, the flared horn portion 28 may have the shape of a cone or rather a frustum.

The antenna system 10 further comprises a cable guide 30 for a line 32 that is not feeding the first antenna 12. As shown in FIGS. 1 and 3, the line 32 is guided via the cable guide 30 towards the second antenna 14. Hence, the line 32 may correspond to a feeding line for the second antenna 14 that is stacked over the first antenna 12. However, the line 32 may also correspond to a power line for an electrical load or any other power-consuming component that is located on top of the first antenna 12.

In some embodiments, the line 32 may be of any type of cable. Thus, the line 32 may correspond to a coaxial cable, a power cable, a hollow conductor, a tube, a wire or any other kind of cable may be guided or rather routed by the cable guide 30 that is located in the feeding portion 20 of the first antenna 12. Generally, the line 32 may be used to conduct an electromagnetic signal or a medium such as a liquid or a gas.

The cable guide 30 has at least one opening 34 provided in the feeding portion 20 of the first antenna 12. The opening 34 is located in a lateral side 36 of the feeding portion 20 that corresponds to the waveguide section 24.

The at least one opening 34 has a center axis O that is inclined with respect to the lateral side 36 of the feeding portion 20 by an inclination angle. The inclination angle may range from 5° to 85°. The inclination generally ensures that the line 32 is routed along the cable guide 30, for example its opening 34, such that the line 32 runs towards the center axis C of the first antenna 12.

Since the feeding portion 20 can be a coaxial feeding portion, two openings 34 are provided that are assigned to the inner conductor and the outer conductor, as will be described later with respect to FIG. 9-11. This ensures that the line 32 can be guided from the outer environment of the feeding portion 20 into the space limited by the inner conductor of the coaxial feeding portion 20.

As shown in FIGS. 1 and 3, the line 32 runs along the center axis C within the flared horn portion 28 of the first antenna 12. Put differently, the line 32 substantially runs along the center axis C of the first antenna 12 within the space defined or rather limited by the flared horn portion 28.

Accordingly, the cable length of line 32 running along the center axis C is minimized This avoids line losses due to a too long length of the line 32. In addition, the radiation pattern of the first antenna 12 is disturbed minimally, as the line 32 runs within the flared horn portion 28 of the first antenna 12 along the center axis C such that its influence on the radiation pattern is symmetrical or rather homogenously distributed.

In FIG. 4, an alternative embodiment is shown in which the cable guide 30 comprises several openings 34, namely at least four openings 34, which are provided in the respective feeding portion 20, namely at opposite lateral sides 36 and within the inner conductor and the outer conductor of the coaxial feeding portion 20. Hence, more than one external line 32, namely more than one line not feeding the first antenna 12 having the cable guide 30, are provided so that these lines 32 can be routed through the feeding portion 20 of the first antenna 12.

Thus, three or more antennas may be stacked over each other. Furthermore, several electrical loads or other components may be located on top of the first antenna 12 having the cable guide 30 in its feeding portion 20.

Figure 7:
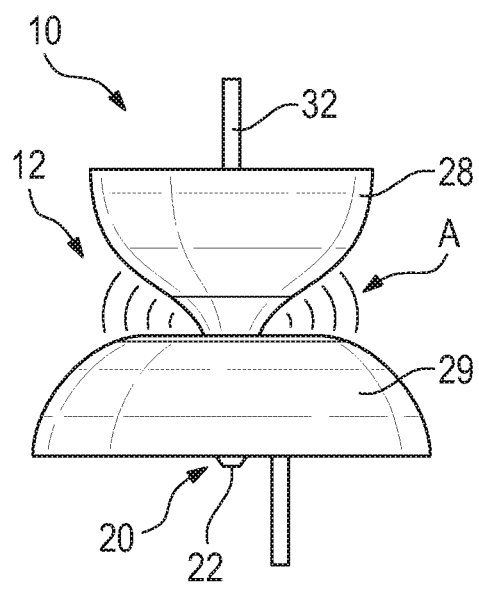
FIG. 7 shows a side view of the antenna system according to FIGS. 5 and 6 wherein a cable is guided within the cable guide.
Figure 8:
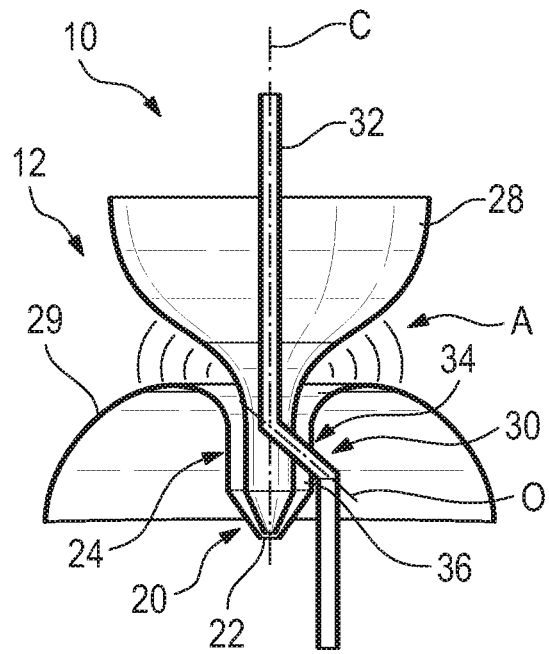
FIG. 8 shows a sectional view of the antenna system shown in FIG. 7.

In FIGS. 5-8, the antenna system 10, for example the first antenna 12 comprising the cable guide 30, is shown in different views, for example without (FIGS. 5 and 6) and with the external line 32 routed via the cable guide 30 (FIGS. 7 and 8). Thus, the respective routing of the external line 32, namely the line not feeding the first antenna 12, is clearly visible.

In general, the opening 34 of the cable guide 30 is located in the feeding portion 20 of the first antenna 12, namely within the lateral side 36 of the waveguide section 24. Thus, the opening 34 is provided in an electrically conductive section of the waveguide section 24 that electromagnetically interacts with the feed point 26, which in turn is connected with the feeding line 18 for receiving the electrical signals to be converted into the electromagnetic waves. Thus, the line 32 routed via the cable guide 30 disturbs the radiation pattern of the first antenna 12 in a minimized manner.

Furthermore, the overall radiation pattern of the antenna system 10 is disturbed in a minimized manner, as the respective antennas 12, 14 are stacked over one another while being omnidirectional antennas, resulting in an omnidirectional antenna system 10.

Figure 9:
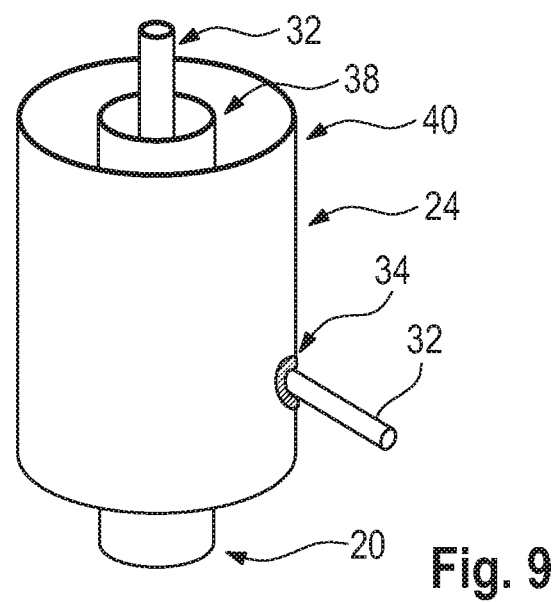
FIG. 9 shows a detail of an antenna system according to an embodiment of the present disclosure.
Figure 10:
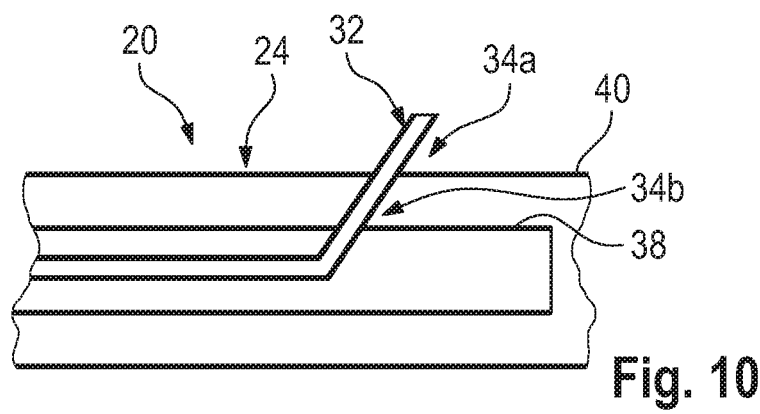
FIG. 10 shows a cross sectional view of FIG. 9 in a first example.
Figure 11:
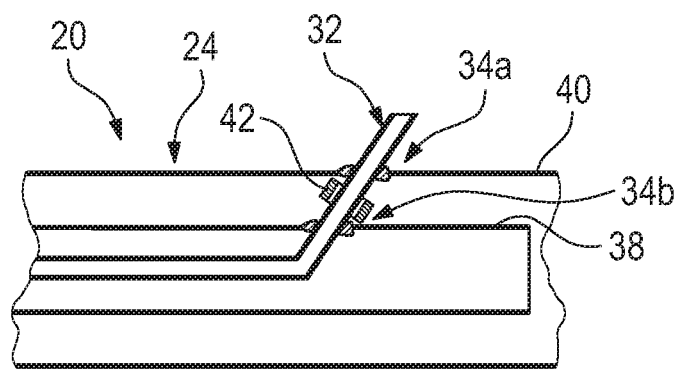
FIG. 11 shows a cross sectional view of FIG. 9 in a second example.

In FIG. 9-11, the feeding portion 20 is shown in more detail. The feeding portion 20 shown in FIGS. 9-11 may relate to the one shown in the previous FIGURES in which the antenna system 10 is shown.

In some embodiments, it becomes obvious that the feeding portion 20 of the first antenna 12 relates to a coaxial feeding portion, as it comprises an inner conductor 38 and an outer conductor 40. Hence, the waveguide section 24 is also a coaxial one, as it comprises the inner conductor 38 and the outer conductor 40 at least partly.

The cable guide 30 comprises two openings 34, wherein a first opening 34a is provided in the outer conductor 40 and a second opening 34b is provided in the inner conductor 38. As shown in FIGS. 10 and 11, the feeding portion 20, namely the inner conductor 38 as well as the outer conductor 40, are penetrated by the line 32, as the line 32 is routed through the respective openings 34.

The line 32 guided through the openings 34 may be (electrically) connected with the first opening 34a and/or the second opening 34b, namely the respective openings 34 in the inner conductor 38 and/or the outer conductor 40. Put differently, the line 32, for example its electromagnetically conductive outer surface portion, may be electrically connected with the inner conductor 38 and/or the outer conductor 40 by the edge of the respective opening 34.

The respective electrical connection may depend on the characteristics to be achieved. In case of two electrical connections, namely an electrical connection between the line 32 and the inner conductor 38 as well as an electrical connection between the line 32 and the outer conductor 40, a ferrite member 42, for instance a ferrite ring, may be provided as shown in FIG. 11.

In any case, it is ensured that the at least one line 32 is guided by the cable guide 30 through the feeding portion 20 of the at least one antenna 12.

The feeding portion 20 may relate to a coaxial feeding portion such that the line 32 runs through openings 34 of the cable guide 32 that are assigned to the inner conductor 38 and the outer conductor 40. In other words, the line 32 penetrates the inner conductor 38 and the outer conductor 40 in order to reach the center axis C.

Then, the line 32 is guided along the center axis C towards the open end of the flared horn portion 28 so as to disturb the overall radiation pattern of the antenna system 10, for example the first antenna 12, in a minimized manner.

Accordingly, an omnidirectional antenna system 10 is provided that has an optimized radiation pattern because the line loss, for example for feeding the second antenna 14, is minimized and the radiation pattern of each antenna 12, 14 is disturbed in a minimized manner. Thus, the overall radiation performance of the antenna system 10 is improved.

Generally, the characteristics and features of the different embodiments shown can be combined in an arbitrary manner.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An antenna system comprising at least one antenna, a feeding line and a cable guide for a line not feeding the at least one antenna, wherein the at least one antenna has a feeding portion to which the feeding line is assigned, and wherein the cable guide has an opening that is provided in the feeding portion, wherein the opening is located at a lateral side of the feeding portion.

2. The antenna system according to claim 1, wherein the feeding portion has an axial end to which the feeding line is connected.

3. The antenna system according to claim 1, wherein the opening has a center axis that is inclined with respect to the lateral side of the feeding portion by an inclination angle.

4. The antenna system according to claim 1, wherein the at least one antenna has a flared horn portion and a center axis, wherein the opening is orientated in the feeding portion such that the line guided through the opening runs substantially along the center axis in the space limited by the flared horn portion.

5. The antenna system according to claim 4, wherein the center axis relates to a rotationally symmetric axis of the at least one antenna.

6. The antenna system according to claim 1, wherein the feeding portion comprises a waveguide section and a feed point.

7. The antenna system according to claim 6, wherein the waveguide section comprises an electromagnetically conductive section.

8. The antenna system according to claim 7, wherein the opening is provided in the electromagnetically conductive section.

9. The antenna system according to claim 7, wherein the electromagnetically conductive section merges partially into a flared horn portion of the at least one antenna.

10. The antenna system according to claim 1, wherein the cable guide has several openings for several lines.

11. The antenna system according to claim 1, wherein the at least one antenna is a coaxial horn antenna.

12. The antenna system according to claim 1, wherein the antenna system relates to an omnidirectional antenna system, wherein the at least one antenna is an omnidirectional antenna.

13. The antenna system according to claim 1, wherein the antenna system has a first antenna and a second antenna which are stacked over one another.

14. The antenna system according to claim 13, wherein the second antenna is a biconical antenna.

15. An antenna system comprising:
at least one antenna;
a feeding line; and
a cable guide for a line not feeding the at least one antenna,
wherein the at least one antenna has a feeding portion to which the feeding line is assigned, wherein the cable guide has an opening that is provided in the feeding portion, wherein the at least one antenna has a flared horn portion and a center axis, and wherein the opening is orientated in the feeding portion such that the line guided through the opening runs substantially along the center axis in the space limited by the flared horn portion.

16. The antenna system according to claim 15, wherein the center axis relates to a rotationally symmetric axis of the at least one antenna.

17. An antenna system comprising at least one antenna, a feeding line and a cable guide for a line not feeding the at least one antenna, wherein the at least one antenna has a feeding portion to which the feeding line is assigned, and wherein the cable guide has an opening that is provided in the feeding portion, wherein the feeding portion comprises a waveguide section and a feed point, wherein the waveguide section comprises an electromagnetically conductive section, and wherein the electromagnetically conductive section merges partially into a flared horn portion of the at least one antenna.

* * * * *